United States Patent
Zhang et al.

(10) Patent No.: US 10,756,357 B2
(45) Date of Patent: Aug. 25, 2020

(54) BIPOLAR PLATE WITH COOLANT FLOW CHANNEL

(71) Applicants: Guosheng Zhang, Beijing (CN); Zhijin Zhang, Beijing (CN)

(72) Inventors: Guosheng Zhang, Beijing (CN); Zhijin Zhang, Beijing (CN)

( * ) Notice: Subject to any disclaimer, the term of this patent is extended or adjusted under 35 U.S.C. 154(b) by 115 days.

(21) Appl. No.: 16/231,950

(22) Filed: Dec. 25, 2018

(65) Prior Publication Data

US 2019/0214658 A1     Jul. 11, 2019

(30) Foreign Application Priority Data

| Jan. 9, 2018 | (CN) | .......................... 2018 1 0017586 |
| Jan. 9, 2018 | (CN) | ..................... 2018 2 0030543 U |
| Apr. 24, 2018 | (CN) | .......................... 2018 1 0373488 |
| Apr. 24, 2018 | (CN) | ..................... 2018 2 0593189 U |

(51) Int. Cl.
    *H01M 8/0267*     (2016.01)
    *H01M 8/0258*     (2016.01)

(52) U.S. Cl.
    CPC ....... *H01M 8/0267* (2013.01); *H01M 8/0258* (2013.01)

(58) Field of Classification Search
    CPC . H01M 8/0267; H01M 8/0228; H01M 8/0258
    See application file for complete search history.

(56) References Cited

U.S. PATENT DOCUMENTS

| 6,492,045 | B1 * | 12/2002 | Blanchet | ............. H01M 8/0254 429/456 |
| 2008/0050638 | A1 * | 2/2008 | Peng | ................... H01M 8/0297 429/457 |
| 2008/0280180 | A1 * | 11/2008 | Correa | ..................... B01J 8/003 429/479 |
| 2015/0280254 | A1 * | 10/2015 | Olsommer | .......... H01M 8/0276 429/437 |
| 2016/0141638 | A1 * | 5/2016 | Sato | ..................... H01M 8/2465 429/457 |

FOREIGN PATENT DOCUMENTS

| DE | 102008055804 | A1 * | 5/2009 | .......... H01M 8/0258 |
| FR | 2976128 | A1 * | 12/2012 | ............ H01M 8/241 |

* cited by examiner

*Primary Examiner* — Imran Akram
(74) *Attorney, Agent, or Firm* — Bayramoglu Law Offices LLC

(57) ABSTRACT

A bipolar plate with a coolant flow channel, includes a fuel flow field plate and an oxidant flow field plate. The bipolar plate includes an alignment area and at least two misalignment areas. In a fuel cell stack containing the bipolar plate, a coolant is enabled to flow from a coolant inlet channel to a coolant flow channel of one misalignment area without passing through a coolant flow channel of the alignment area. Also, the coolant is enabled to flow from a coolant flow channel of the other misalignment area to a coolant outlet channel without passing through the coolant flow channel of the alignment area.

13 Claims, 8 Drawing Sheets

BIPOLAR PLATE WITH COOLANT FLOW CHANNEL

CROSS REFERENCE TO RELATED APPLICATIONS

This application is based upon and claims priority to Chinese Patent Application No. 201810017586.0, filed on Jan. 9, 2018, Chinese Patent Application No. 201820030543.1, filed on Jan. 9, 2018, Chinese Patent Application No. 201810373488.0, filed on Apr. 24, 2018, and Chinese Patent Application No. 201820593189.3, filed on Apr. 24, 2018, the entire contents of which are incorporated herein by reference.

TECHNICAL FIELD

The present invention relates to a bipolar plate, and particularly to a bipolar plate with a coolant flow channel which is applied in a large-scale fuel cell stack.

BACKGROUND

A fuel cell is an electrochemical reaction device capable of converting chemical energy into electrical energy. Without the restriction of the Carnot cycle, theoretically, the energy conversion efficiency of a fuel cell is higher than that of an internal combustion engine (the maximum energy conversion efficiency of a fuel cell can be 80% or more, and generally, the energy conversion efficiency of a fuel cell is not less than 50%). Moreover, fuel cells have many advantages such as zero emissions, no mechanical noise, etc. Accordingly, fuel cells are popular in the military and civilian fields. According to different electrolytes used in fuel cells, the fuel cells can be classified into five types: alkaline fuel cell (AFC), phosphoric acid fuel cell (PAFC), molten carbonate fuel cell (MCFC), solid oxide fuel cell (SOFC) and proton exchange membrane fuel cell (PEMFC). Among them, solid polymer membrane is used as the electrolyte in PEMFC, so it has the advantages of simple structure, low working temperature and high energy conversion efficiency. Therefore, PEMFC is granted with the exceptional edge in mobile power source. Reportedly, at present, Germany and France have developed PEMFC-powered submarines, and several of the world's top automobile companies, such as Toyota Motor Corporation of Japan, have developed PEMFC-powered fuel cell electric vehicles (abbreviated as FCEV or FCV) which have been available for mass production. As an important mobile power source, PEMFC has a good development prospect.

Each individual PEMFC cell consists of two plates (one anode plate and one cathode plate) and a membrane electrode sandwiched between the two plates. The membrane electrode is composed of an anode catalyst, a proton exchange membrane, and a cathode catalyst which are formed together. A gas diffusion layer (GDL) is usually disposed between the anode plate and the membrane electrode, and between the membrane electrode and the cathode plate. The gas diffusion layer is usually made of a gas-permeable carbon paper or carbon cloth. In some disclosures, the gas diffusion layer is a part of the membrane electrode, while in other disclosures the gas diffusion layer is a separate component in the PEMFC. The anode plate of the PEMFC is provided with a fuel flow channel, which is a place where fuel (energetic compounds existing in the state of gas or liquid at normal temperature and pressure, such as hydrogen or methanol) flows and is transported, and the fuel is transported to the anode catalyst via the fuel flow channel. The cathode plate of the PEMFC is provided with an oxidant flow channel, which is a place where the oxidant (usually oxygen or air) flows and is transported, and the oxidant is transported to the cathode catalyst via the oxidant flow channel. By means of the fuel flow channel and the oxidant flow channel, the fuel and oxidant can be continuously transported into the fuel cell so that the fuel cell can continuously output electrical energy.

The structure of Alkaline fuel cell (AFC) is similar to that of the proton exchange membrane fuel cell. Alkaline fuel cell is mainly different from the proton exchange membrane fuel cell in that the electrolyte is different, the fuel flow channel is disposed on its cathode plate, and the oxidant flow channel is disposed on its anode plate. Generally, in order to avoid confusion, the fuel cell plate provided with a fuel flow channel, regardless of whether it is a cathode plate or an anode plate, is collectively referred to as a fuel flow field plate. Similarly, the fuel cell plate provided with an oxidant flow channel, regardless of whether it is a cathode plate or an anode plate, is collectively referred to as an oxidant flow field plate.

In order to improve the total generated power of the fuel cell, a plurality of individual cells are usually connected in series to form a fuel cell stack. In the fuel cell stack, except for the two individual cells at the outermost side, the fuel flow field plates of the individual cells located inside the fuel cell stack are closely appressed with the oxidant flow field plates of the adjacent individual cells. If the fuel flow field plates and the oxidant flow field plates that are appressed with each other are fixedly connected to each other to form an individual component, the structure of the fuel cell stack can be simplified and the reliability of the operation of the fuel cell stack can be improved. Further, the separate component formed by the combination of fuel flow field plate and oxidant flow field plate is called a bipolar plate.

The bipolar plate is one of the critical components of fuel cell stacks, which can realize various functions in the fuel cell stack, such as supporting the membrane electrode assembly, distributing the reaction gas, transmitting current, conducting heat, and discharging the reaction product i.e. water, etc. At the current technical level, the manufacturing cost of the bipolar plate accounts for about half of the total manufacturing cost of the entire fuel cell stack.

Both of the fuel flow field plate and the oxidant flow field plate constituting the bipolar plate are in typical plate-like shapes (i.e. the length and width are much greater than the thickness). Each fuel flow field plate has two opposite surfaces, one surface contains a reference surface and a fuel flow channel (here, referred to as a first surface). Another surface contains a reference surface, and in the fuel cell stack, the reference surface is in contact with the oxidant flow field plate (here, referred to as the second surface). Similarly, each oxidant flow field plate also has two opposite surfaces, one surface contains a reference surface and an oxidant flow channel (here, referred to as the third surface). Another surface contains a reference surface, and, in the fuel cell stack, the reference surface is in contact with the fuel flow field plate (here, referred to as the fourth surface). The reference surface described herein refers to a specific part of the fuel flow field plate or the oxidant flow field plate. If the length direction of the bipolar plate is regarded as an X axis, the width direction of the bipolar plate is regarded as a Y axis, and the thickness direction of the bipolar plate is regarded as a Z axis, then the reference surfaces of the fuel flow field plate and oxidant flow field plate are parallel to the plane formed by the X axis and Y axis and perpendicular to the Z axis. Moreover, the distance between the reference surface on the first surface and the reference surface on the second surface is equal to the thickness of the fuel flow field plate. The distance between the reference surface on the third surface and the reference surface on the fourth surface is equal to the thickness of the oxidant flow field plate. The fuel flow channel, the oxidant flow channel, and the coolant flow channel are grooves formed in the Z-axis direction with respect to the reference surface on respective surface. When assembling the bipolar plates, the second surface of the fuel flow field plate and the fourth surface of the oxidant flow field plate are closely appressed with each other and the two plates are fixedly connected by welding, adhesion or other connection methods.

In the fuel cell stacks, most of the chemical energy carried by the fuel is converted into electrical energy, while a certain part of the chemical energy is converted into heat energy. Therefore, in view of a fuel cell stack having a large generated power, the heating power is also rather large. As a result, the cooling of the fuel cell stack becomes a noticeable problem. If the cooling intensity is insufficient, the temperature of the fuel cell stack will increase continuously, which will cause burn-out of the fuel cell stack. In order to ensure that the fuel cell stack generates electricity continuously at a relatively constant temperature, it is necessary to introduce a coolant into the stack to strengthen the cooling of the stack. Currently, the commonly adopted method is to provide a coolant flow channel on the second surface of the fuel flow field plate and/or the fourth surface of the oxidant flow field plate, and to introduce the coolant into the interlayer of the bipolar plate to carry the heat energy generated by the reaction out of the fuel cell stack.

For such kind of fuel cell stack with a large generated power, since the bipolar plate is required to be provided with the coolant flow channel, the bipolar plate is usually designed with a "three-in, three-out" structure. Namely, a fuel flow channel is disposed on one surface of the bipolar plate, an oxidant flow channel is disposed on another surface of the bipolar plate, a coolant flow channel is disposed at the middle of the bipolar plate, and a fuel inlet channel, a fuel outlet channel, an oxidant inlet channel, an oxidant outlet channel, a coolant inlet channel, and a coolant outlet channel are disposed at the edges of the bipolar plate. It should be noted that in some disclosures, the inlet/outlet channels are also referred to as manifolds.

In addition, the bipolar plates must be made of conductive materials due to the requirement of current transmitting. Currently, there are three main types of materials used for making bipolar plates, i.e. graphite materials, composite materials, and metal materials. Graphite bipolar plates have good electrical conductivity and high corrosion resistance. However, due to the high brittleness and poor mechanical properties of the graphite material, the manufacturing cost of the graphite bipolar plates is relatively high. The main raw materials of the composite bipolar plate include graphite powder and resin, and the composite bipolar plate is manufactured by means of molding, etc. So, it has a relatively low manufacturing cost while having problems such as low conductivity and poor airtightness. The bipolar plates formed by sheet metal (such as titanium plate, stainless steel plate or aluminum plate with a thickness of 0.1-0.2 mm, etc.) subjected to stamping and then to the processes of welding, anti-corrosion treatment, etc., and have high strength, good performances of electrical conductivity and thermal conductivity, and a relatively low manufacturing cost, which is the mainstream method for manufacturing bipolar plates, currently.

The bipolar plate with a "three-in, three-out" structure formed by sheet metal subjected to stamping has two noticeable characteristics. First, the fuel flow field plate and the oxidant flow field plate are both in a corrugated shape. Namely, the coolant flow channel is simultaneously formed following the formation of the fuel flow channel or the oxidant flow channel. If the length direction of one polar plate is regarded as an X axis, the width direction of the polar plate is regarded as a Y axis, and the thickness direction of the polar plate is regarded as a Z axis, for a specific point on the polar plate (i.e., a point that corresponds to a specific X-axis coordinate and a specific Y-axis coordinate), if the first surface where the point is located is the reference surface, then the second surface where the point is located is the bottom of the coolant flow channel; if the first surface where the point is located is the bottom of the fuel flow channel, then the second surface where the point is located is the reference surface; if the third surface where the point is located is the reference surface, then the fourth surface where the point is located is the bottom of the coolant flow channel; if the third surface where the point is located is the bottom of the oxidant flow channel, then the fourth surface where the point is located is the reference surface. Second, both of the second surface of the fuel flow field plate and the fourth surface of the oxidant flow field plate are provided with the coolant flow channel. Moreover, except for some special parts, the coolant flow channel on the second surface of the fuel flow field plate and the coolant flow channel on the fourth surface of the oxidant flow field plate are aligned and combined with each other in a snap-fit manner (i.e., the projections of the two coolant flow channels in the plane formed by the X axis and the Y axis are overlapped with each other) to form a complete coolant flow channel when assembling the bipolar plate. Normally, the coolant flow channel on the second surface of the fuel flow field plate and the coolant flow channel on the fourth surface of the oxidant flow field plate each account for a half of the coolant flow channel.

The above two characteristics cause a problem that in the fuel cell stack, the fuel inlet channel, the various fuel flow channels and the fuel outlet channel must form a closed space to avoid fuel leakage and mixing of fuel and oxidant because the fuel leakage and mixing of fuel and oxidant are dangerous and can cause fire or even an explosion under the action of electrode catalyst. Therefore, the various fuel flow channels must be isolated from the coolant inlet channel and the coolant outlet channel. Correspondingly, the coolant flow channel located on the back surface (second surface) of the fuel flow channel and between the two fuel flow channels is naturally isolated from the coolant inlet channel and the coolant outlet channel. Unless specific measures are taken to interconnect these coolant flow channels with the coolant inlet channels and the coolant outlet channels, these coolant flow channels will form separated closed spaces where the coolant cannot flow in and out. Therefore, when the bipolar plate having the "three-in, three-out" structure is formed by the metal sheet subjected to stamping, how to interconnect various coolant flow channels with the coolant inlet channel and the coolant outlet channel to improve the cooling intensity of the fuel cell stack and the temperature control system of the fuel cell stack is of great significance. So far, however, few studies focus on this issue.

In addition, when a bipolar plate having a "three-in, three-out" structure is formed by the metal sheet subjected to stamping, the design solution available now also has problems in the layout of various channels. According to the design solution available now, the coolant inlet channel and the coolant outlet channel are respectively disposed at intermediate positions of both ends of the bipolar plate. Since the coolant is a fluid, and the path with the minimum flow resistance during its flow will always have the maximum flow rate. Therefore, when the coolant flows in the interlayer of the bipolar plate, the cooling intensity of the middle part of the bipolar plate will be significantly higher than that of both sides. The two sides of the bipolar plate, which accounts for about two-thirds of the total area of the bipolar plate, are "dead area" for the coolant and thus cannot be sufficiently cooled.

SUMMARY

The present invention aims to solve the above-mentioned problems when producing the bipolar plate having "three-in, three-out" structure formed by metal sheet subjected to stamping, maximize the cooling effect of the fuel cell stack, and reduce the area and weight of the bipolar plate, thereby increasing the power density of the fuel cell stack. Meanwhile, the fuel flow field plate and the oxidant flow field plate have the same geometrical shape, so as to reduce the manufacturing cost of the bipolar plate.

To achieve the above-mentioned objectives, the technical solutions of the present invention are as follows.

A bipolar plate with a coolant flow channel includes a fuel flow field plate and an oxidant flow field plate. The fuel flow field plate, the oxidant flow field plate and the bipolar plate are all plate-shaped, and the lengths and widths thereof are ten times greater than the thicknesses thereof. The fuel flow field plate includes a first surface and a second surface. The first surface is provided with a fuel flow channel and a first reference surface. The second surface is provided with a first flow channel and a second reference surface. The oxidant flow field plate includes a third surface and a fourth surface. The third surface is provided with an oxidant flow channel and a third reference surface. The fourth surface is provided with a second flow channel and a fourth reference surface. The second surface of the fuel flow field plate and the fourth surface of the oxidant flow field plate are appressed to each other to form the bipolar plate. The first reference surface, the second reference surface, the third reference surface, and the fourth reference surface are back surfaces of bottoms of the first flow channel, the fuel flow channel, the second flow channel, and the oxidant flow channel, respectively. The fuel flow channel, the first flow channel, the oxidant flow channel, and the second flow channel are grooves formed in a thickness direction of the bipolar plate with respect to the first reference surface, the second reference surface, the third reference surface, and the fourth reference surface, respectively. The fuel flow field plate and the oxidant flow field plate are provided with six through holes including a fuel inlet channel, a fuel outlet channel, an oxidant inlet channel, an oxidant outlet channel, a coolant inlet channel, and a coolant outlet channel.

The bipolar plate includes an alignment area and at least two misalignment areas. In the alignment area, the second reference surface on the second surface and the fourth reference surface on the fourth surface are in contact with each other. Each misalignment area includes both of the second reference surface and the fourth reference surface, and the second reference surface and the fourth reference surface in the misalignment area are not in contact with each other.

The coolant inlet channel is interconnected with the first flow channel or the second flow channel in one misalignment area. The coolant outlet channel is interconnected with the first flow channel or the second flow channel in another misalignment area. A position of the coolant inlet channel satisfies the following condition: a flow direction of the coolant flowing from the coolant inlet channel into the first flow channel or the second flow channel is perpendicular or approximately perpendicular to a flow direction of the fuel flowing from the fuel inlet channel into the fuel flow channel, and an acute angle formed by the two directions is greater than 45°. A position of the coolant outlet channel satisfies the following condition: a flow direction of the coolant flowing from the first flow channel or the second flow channel into the coolant outlet channel is perpendicular or approximately perpendicular to a flow direction of the fuel flowing from the fuel flow channel into the fuel outlet channel, and an acute angle formed by the two directions is greater than 45°.

Further, one misalignment area is formed by increasing a first interval between a part of the first flow channels on the fuel flow field plate and the adjacent first flow channels pertaining to the alignment area. The first interval is greater than an interval between the second flow channel of the misalignment area on the oxidant flow field plate and the adjacent second flow channel pertaining to the alignment area. Another misalignment area is formed by increasing a second interval between a part of the second flow channels on the oxidant flow field plate and the adjacent second flow channel pertaining to the alignment area. The second interval is greater than an interval between the first flow channel of the misalignment area on the fuel flow field plate and the adjacent first flow channel pertaining to the alignment area.

Further, the fuel flow channel, the oxidant flow channel, the first flow channel, and the second flow channel are all S-shaped or serpentine shaped.

A bipolar plate with a coolant flow channel includes a fuel flow field plate and an oxidant flow field plate. The fuel flow field plate, the oxidant flow field plate and the bipolar plate are all plate-shaped, and the lengths and widths thereof are ten times greater than the thicknesses thereof. The fuel flow field plate includes a first surface and a second surface. The first surface is provided with a fuel flow channel and a first reference surface. The second surface is provided with a first flow channel and a second reference surface. The oxidant flow field plate includes a third surface and a fourth surface. The third surface is provided with an oxidant flow channel and a third reference surface. The fourth surface is provided with a second flow channel and a fourth reference surface. The second surface of the fuel flow field plate and the fourth surface of the oxidant flow field plate are appressed with each other to form the bipolar plate. The first reference surface, the second reference surface, the third reference surface, and the fourth reference surface are back surfaces of bottoms of the first flow channel, the fuel flow channel, the second flow channel, and the oxidant flow channel, respectively. The fuel flow channel, the first flow channel, the oxidant flow channel, and the second flow channel are grooves formed in a thickness direction of the bipolar plate with respect to the first reference surface, the second reference surface, the third reference surface, and the fourth reference surface, respectively. The fuel flow field plate and the oxidant flow field plate are provided with six through holes including a fuel inlet channel, a fuel outlet channel, an oxidant inlet channel, an oxidant outlet channel, a coolant inlet channel, and a coolant outlet channel.

The bipolar plate includes an alignment area and at least two misalignment areas. The alignment area includes the first flow channel, the second reference surface, the second flow channel, and the fourth reference surface; and the second reference surface and the fourth reference surface are in contact with each other. Each misalignment area includes the first flow channel, the second reference surface, the second flow channel, and the fourth reference surface; and the second reference surface and the fourth reference surface are not in contact with each other. The two misalignment areas are separated by the alignment area. In the fuel cell stack containing the bipolar plate, the coolant can flow from the coolant inlet channel to the first flow channel or the second flow channel of one misalignment area without passing through the first flow channel and the second flow channel of the alignment area. Also, the coolant can flow from the first flow channel or the second flow channel of another misalignment area to the coolant outlet channel without passing through the first flow channel and the second flow channel of the alignment area.

The first flow channel, the fuel flow channel, the second flow channel and the oxidant flow channel each include some longitudinal sections and some transverse sections. Flow directions of the fluid (e.g. fuel, oxidant or coolant) in the longitudinal section and the transverse section are perpendicular or approximately perpendicular to each other. The flow directions of the fluid (e.g. fuel, oxidant or coolant) in different longitudinal sections are parallel or approximately parallel to each other. A total length of the longitudinal sections constituting the first flow channel is longer than or equals to a total length of the transverse sections constituting the first flow channel. A total length of the longitudinal sections constituting the second flow channel is longer than or equals to a total length of the transverse sections constituting the second flow channel.

The first flow channels in the two misalignment areas pertain to the longitudinal sections of the first flow channel. The second flow channels in the two misalignment areas pertain to the longitudinal sections of the second flow channel. The fuel inlet channel and the fuel outlet channel are connected to the transverse sections of the fuel flow channel. The oxidant inlet channel and the oxidant outlet channel are connected to the transverse sections of the oxidant flow channel.

Further, in the two misalignment areas, a junction of one misalignment area and the alignment area has a portion where the first interval is greater than the second interval. A junction of another misalignment area and the alignment area has a portion where the second interval is greater than the first interval. The first interval refers to the distance between the first flow channel pertaining to the misalignment area on the fuel flow field plate and the adjacent first flow channel pertaining to the alignment area. The second interval refers to the distance between the second flow channel pertaining to the misalignment area on the oxidant flow field plate and the adjacent second flow channel pertaining to the alignment area.

Further, both of the coolant inlet channel and the coolant outlet channel are connected to a plurality of misalignment areas. The plurality of misalignment areas connected to the coolant inlet channel form a first interconnection area and a second interconnection area. The first interconnection area includes a plurality of misalignment areas, and the plurality of misalignment areas are separated by upper support platforms. Similarly, the second interconnection area also includes a plurality of misalignment areas, and the plurality of misalignment areas are separated by lower support platforms. The plurality of misalignment areas connected to the coolant outlet channel form a third interconnection area and a fourth interconnection area. The third interconnection area includes a plurality of misalignment areas, and the plurality of misalignment areas are separated by upper support platforms. Similarly, the fourth interconnection area also includes a plurality of misalignment areas, and the plurality of misalignment areas are separated by lower support platforms. The upper support platforms described herein refers to the second reference surface formed by cutting off the first flow channel. The lower support platforms described herein refers to the fourth reference surface formed by cutting off the second flow channel.

Further, the fuel flow field plate and the oxidant flow field plate are in a same geometrical shape.

Further, both of the fuel flow field plate and the oxidant flow field plate are provided with a positioning device. When the fuel flow field plate and the oxidant flow field plate are assembled into a bipolar plate, the fuel flow field plate and the oxidant flow field plate can be appressed to each other according to a predetermined position by means of the positioning device. The fuel flow field plate and the oxidant flow field plate are each provided with a sealing groove.

Further, the fuel flow field plate and the oxidant flow field plate are formed by a metal or alloy sheet having a thickness less than 0.2 mm subjected to the press working.

The present invention has the following advantages. The bipolar plate with a coolant flow channel provided by the present invention enables the coolant inlet channel, the coolant outlet channel, and the coolant flow channel to be interconnected completely without increasing the thickness of the bipolar plate. The coolant is enabled to flow through all the reaction areas when the fuel cell stack is working, thereby significantly increasing the cooling effect of the fuel cell stack. Meanwhile, the present invention not only can save on raw materials for manufacturing the bipolar plates, reduce the area and weight of the bipolar plate, and thus improve the power density of the fuel cell stack, but also can successfully realize the objective of allowing the fuel flow field plate and the oxidant flow field plate to have completely the same geometrical shape, thereby facilitating the reduction of manufacturing costs of the bipolar plate.

DETAILED DESCRIPTION OF THE EMBODIMENTS

Figure 1:
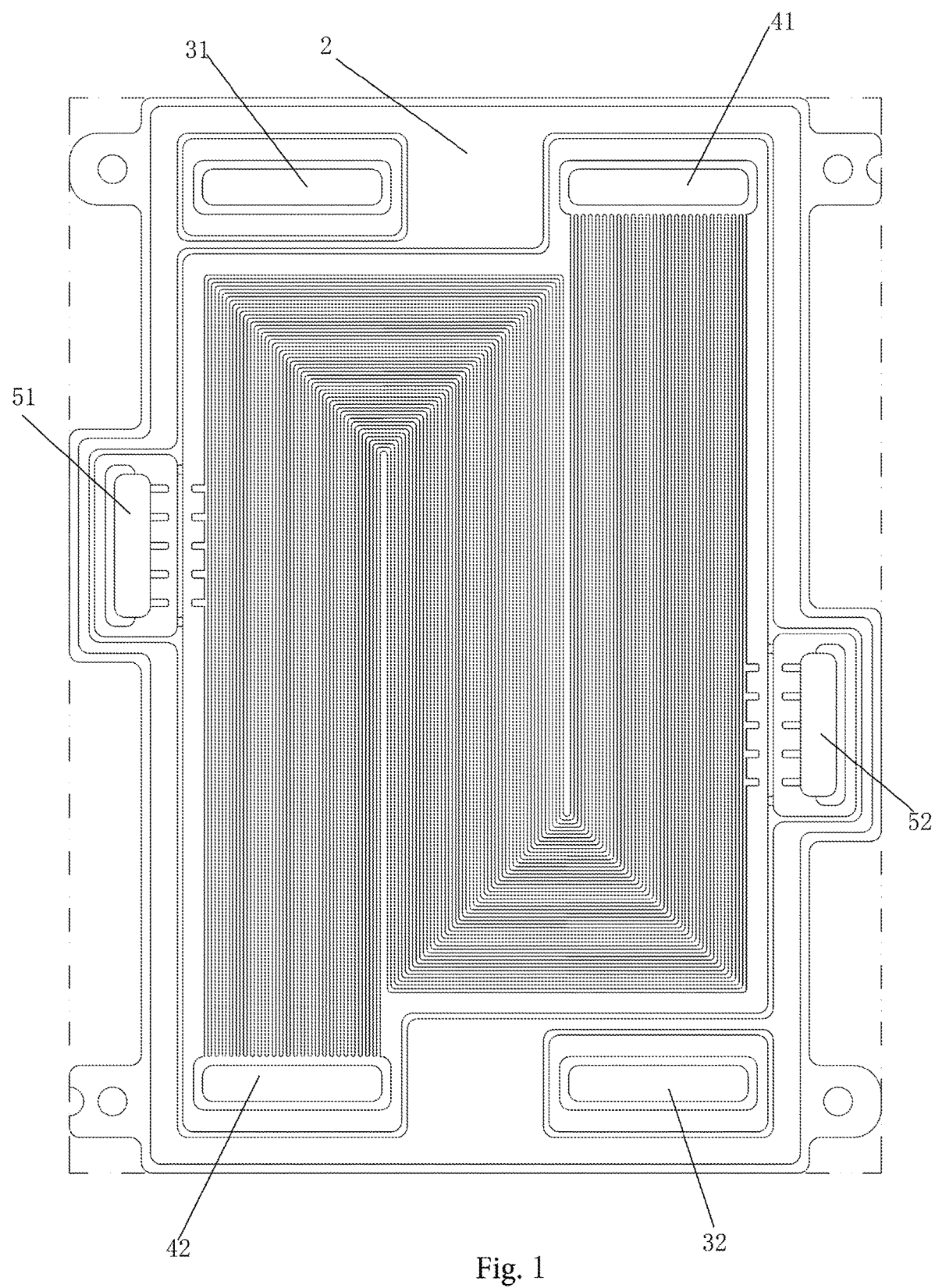
FIG. 1 is a structural schematic diagram of an oxidant flow field plate of a bipolar plate described in embodiment one.

The present invention will be further described hereinafter with reference to the drawings and specific embodiments, so that the present invention can be better understood and implemented by those skilled in the art. However, the embodiments described are not intended to limit the present invention.

FIGS. 1-5 show embodiment one of a bipolar plate with a coolant flow channel provided by the present invention, which includes a fuel flow field plate 1 and an oxidant flow field plate 2. The fuel flow field plate 1, the oxidant flow field plate 2, and the bipolar plate are all plate-shaped, and the lengths and widths thereof are far greater than the thicknesses thereof. The fuel flow field plate 1 and the oxidant flow field plate 2 are metal plates of the same shape (e.g. a rectangular shape) and are formed by stainless steel plates or titanium alloy plates having a thickness of 0.1-0.2 mm that are subjected to stamping.

A top surface and a bottom surface of the fuel flow field plate 1 are a first surface 11 and a second surface 12, respectively. The first surface 11 is formed with a first reference surface 112 between a fuel flow channel 111 and the adjacent fuel flow channel 111. The second surface 12 is formed with a second reference surface 122 between a first flow channel 121 and the adjacent first flow channel 121. A bottom surface and a top surface of the oxidant flow field plate 2 are a third surface 21 and a fourth surface 22, respectively. The third surface 21 is formed with a third reference surface 212 between an oxidant flow channel 211 and the adjacent oxidant flow channel 211. The fourth surface 22 is formed with a fourth reference surface 222 between a second flow channel 221 and the adjacent second flow channel 221. Taking the length direction of the bipolar plate as the X axis, the width direction of the bipolar plate as the Y axis, and the thickness direction of the bipolar plate as the Z axis, then the first reference surface 112, the second reference surface 122, the third reference surface 212, and the fourth reference surface 222 are parallel to the plane formed by the X axis and Y axis and perpendicular to the Z axis. The fuel flow channel 111, the first flow channel 121, the oxidant flow channel 211, and the second flow channel 221 are grooves formed in a thickness direction of the bipolar plate with respect to the first reference surface 112, the second reference surface 122, the third reference surface 212, and the fourth reference surface 222, respectively.

One end of the fuel flow field plate 1 is provided with a fuel inlet channel 31, an oxidant inlet channel 41, and another end of the fuel flow field plate 1 is provided with a fuel outlet channel 32 and an oxidant outlet channel 42. The fuel inlet channel 31 and the fuel outlet channel 32 are interconnected with the fuel flow channel 111. One end of the oxidant flow field plate 2 is provided with the oxidant inlet channel 41, a fuel inlet channel 31, and another end of the oxidant flow field plate 2 is provided with an oxidant outlet channel 42 and a fuel outlet channel 32. The oxidant inlet channel 41 and the oxidant outlet channel 42 are interconnected with the oxidant flow channel 211.

The fuel flow field plate 1 and the oxidant flow field plate 2 are overlapped and fixed together, and the second surface 12 is adjacent to the fourth surface 22, so that the first flow channel 121 and the second flow channel 221 correspond to each other. The fuel flow field plate 1 and the oxidant flow field plate 2 are provided with a positioning device special for assembling the bipolar plate. When the fuel flow field plate and the oxidant flow field plate are assembled into a bipolar plate, the fuel flow field plate and the oxidant flow field plate can be appressed to each other according to a predetermined position by means of the positioning device special for the assembly of the bipolar plate. The fuel flow field plate is provided a sealing groove. When assembling the fuel cell stack, the sealing groove may be filled with a specific sealing material to prevent fuel leakage. The corresponding areas of the first flow channel 121 and the second flow channel 221 of the bipolar plate include an alignment area D and at least two misalignment areas E. In the alignment area D, the first flow channel 121 is aligned with the second flow channel 221, and the center lines of their projections in the plane formed by the X axis and the Y axis are overlapped to form a plurality of aligned independent closed coolant flow channel D1. The cross sections of the first flow channel 121 and the second flow channel 221 are in the shape of an isosceles trapezoid, so that the cross section of aligned coolant flow channel D1 is in the shape of a regular hexagon. In the misalignment area E, the first flow channel 121 and the second flow channel 221 are staggered with each other, and the center lines of their projections in the plane formed by the X axis and the Y axis are parallel and do not overlap, and the second reference surface 122 and the fourth reference surface 222 are also staggered, thereby forming an interconnected misaligned coolant flow channel E1 with a wavy cross section. The misaligned coolant flow channel E1 and each aligned coolant flow channel D1 are connected at the intersection.

The misaligned coolant flow channel E1 in one misalignment area E is interconnected with a coolant inlet channel 51. The misaligned coolant flow channel E1 in another misalignment area E is interconnected with a coolant outlet channel 52. The coolant inlet channel 51 is located at a side of the misaligned coolant flow channel E1, and is located at a different side of the bipolar plate with respect to the fuel inlet channel 31 and the fuel outlet channel 32. The flow direction of the coolant flowing from the coolant inlet channel 51 into the misaligned coolant flow channel E1 is perpendicular or approximately perpendicular to the flow direction of the fuel flowing from the fuel inlet channel 31 into the fuel flow channel 111. The coolant outlet channel 52 is located at a side of the misaligned coolant flow channel E1, and is located at a different side of the bipolar plate with respect to the fuel inlet channel 31 and the fuel outlet channel 32. The flow direction of the coolant flowing from the misaligned coolant flow channel E1 into the coolant outlet channel 52 is perpendicular or approximately perpendicular to the flow direction of the fuel flowing from the fuel flow channel 111 into the fuel outlet channel 32.

There are two misalignment areas E, and three cases are described as follows.

A. One misalignment area E is located on the fuel flow field plate 1 near the fuel inlet channel 31, and is formed by increasing a first interval between a part of the first flow channels 121 on the fuel flow field plate 1 and the adjacent first flow channel 121 pertaining to the alignment area D. The first interval is greater than the interval between the second flow channel 221 of the misalignment area E on the oxidant flow field plate 2 and the adjacent second flow channel 221 pertaining to the alignment area D. Another misalignment area E is located on the oxidant flow field plate 2 near the oxidant inlet channel 41, and is formed by increasing a second interval between a part of the second flow channels 221 on the oxidant flow field plate 2 and the adjacent second flow channel 221 pertaining to the alignment area D. The second interval is greater than the interval between the first flow channel 121 of the misalignment area E on the fuel flow field plate 1 and the adjacent first flow channel 121 pertaining to the alignment area D. In this way, the fuel flow field plate 1 and the oxidant flow field plate 2 have the same structure, which can reduce the number molds and the manufacturing cost.

B. The misalignment areas E are all located on the fuel flow field plate 1 near the fuel inlet channel 31 and the fuel outlet channel 32, respectively. The misalignment areas E are respectively formed by increasing a first interval between a part of the first flow channels 121 on the fuel flow field plate 1 and the adjacent first flow channel 121 pertaining to the alignment area D. The first interval is greater than the interval between the second flow channel 221 of the misalignment area E on the oxidant flow field plate 2 and the adjacent second flow channel 221 pertaining to the alignment area D.

C. The misalignment areas E are all located on the oxidant flow field plate 1 near the oxidant inlet channel 41 and the oxidant outlet channel 42, respectively. The misalignment areas E are respectively formed by increasing a first interval between a part of the second flow channels 221 on the oxidant flow field plate 2 and the adjacent second flow channel 221 pertaining to the alignment area D. The first interval is greater than the interval between the first flow channel 121 of the misalignment area E on the fuel flow field plate 1 and the adjacent first flow channel 121 pertaining to the alignment area D.

Since multiple bipolar plates are overlapped and fixed in the use of the bipolar plate, compression and deformation occur easily at the positions of the coolant inlet channel 51 and the coolant outlet channel 52. As a result, the channels are blocked. Accordingly, in the present invention, a plurality of rows of support platforms 6 are provided at the coolant inlet channel and the coolant outlet channel. Each support platform 6 is formed by cutting off a part of misaligned coolant flow channel E1 located in the misalignment area E on the second surface 12 or the fourth surface 22. When assembling the bipolar plate, the support platforms 6 are in contact with the reference surface on the fourth surface or the second surface to play a supporting role.

The present invention has the advantages of a stable structure, less molds, lower manufacturing cost, and the coolant is enabled to flow in most (more than two-thirds) of the fuel flow channels or the oxidant flow channels, thereby providing a good cooling effect and improving the security of using the bipolar plate.

Figure 2:
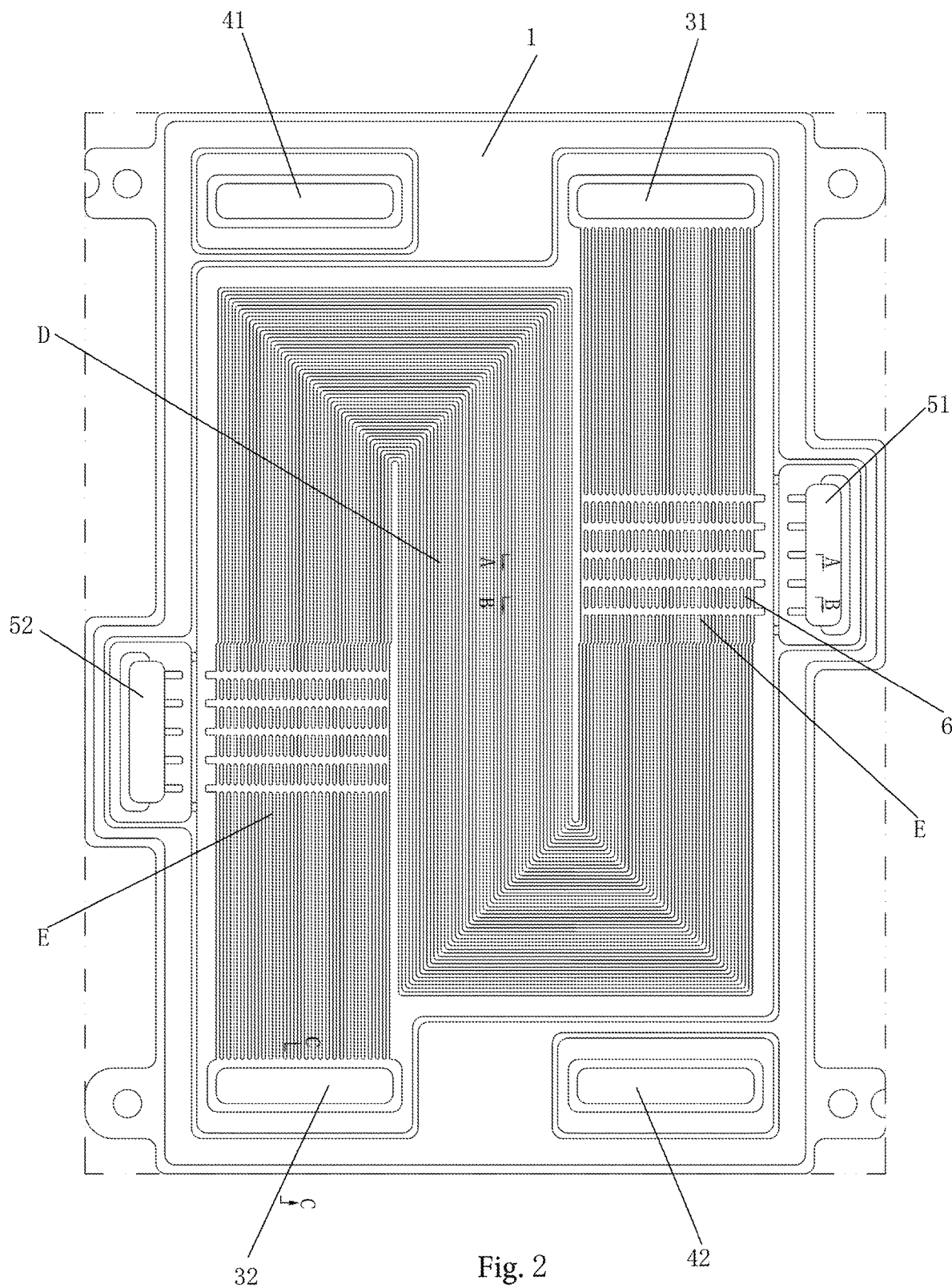
FIG. 2 is a structural schematic diagram of a fuel flow field plate of a bipolar plate described in embodiment one.
Figure 3:
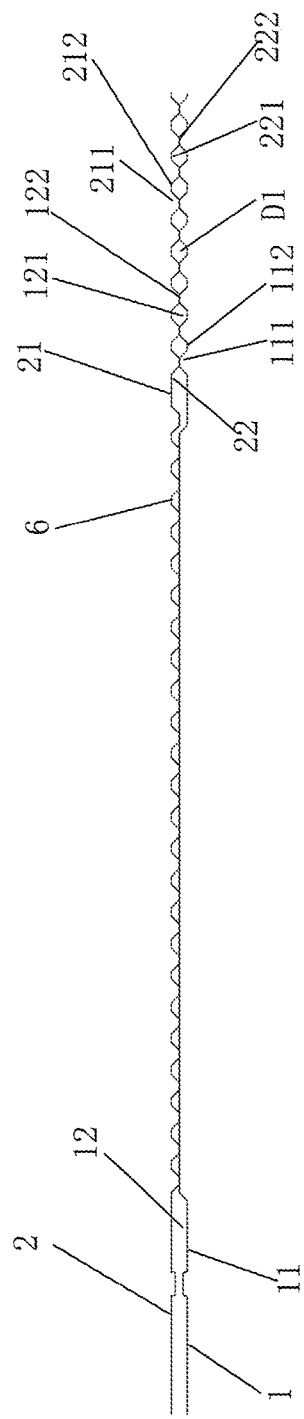
FIG. 3 is a cross-sectional diagram of a bipolar plate described in embodiment one at a position corresponding to the A-A direction shown in FIG. 2.
Figure 4:
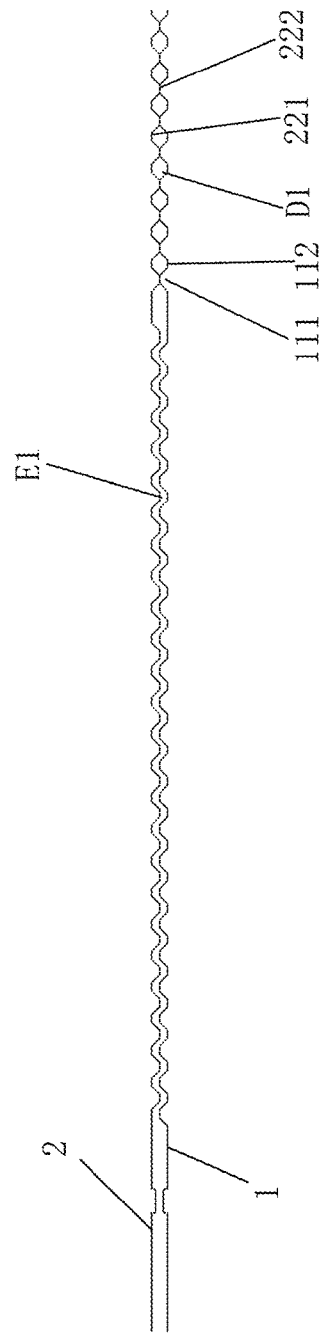
FIG. 4 is a cross-sectional diagram of a bipolar plate described in embodiment one at a position corresponding to the B-B direction shown in FIG. 2.
Figure 5:
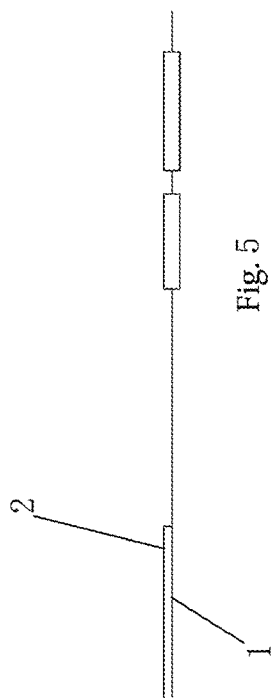
FIG. 5 is a cross-sectional diagram of a bipolar plate described in embodiment one at a position corresponding to the C-C direction shown in FIG. 2.
Figure 6:
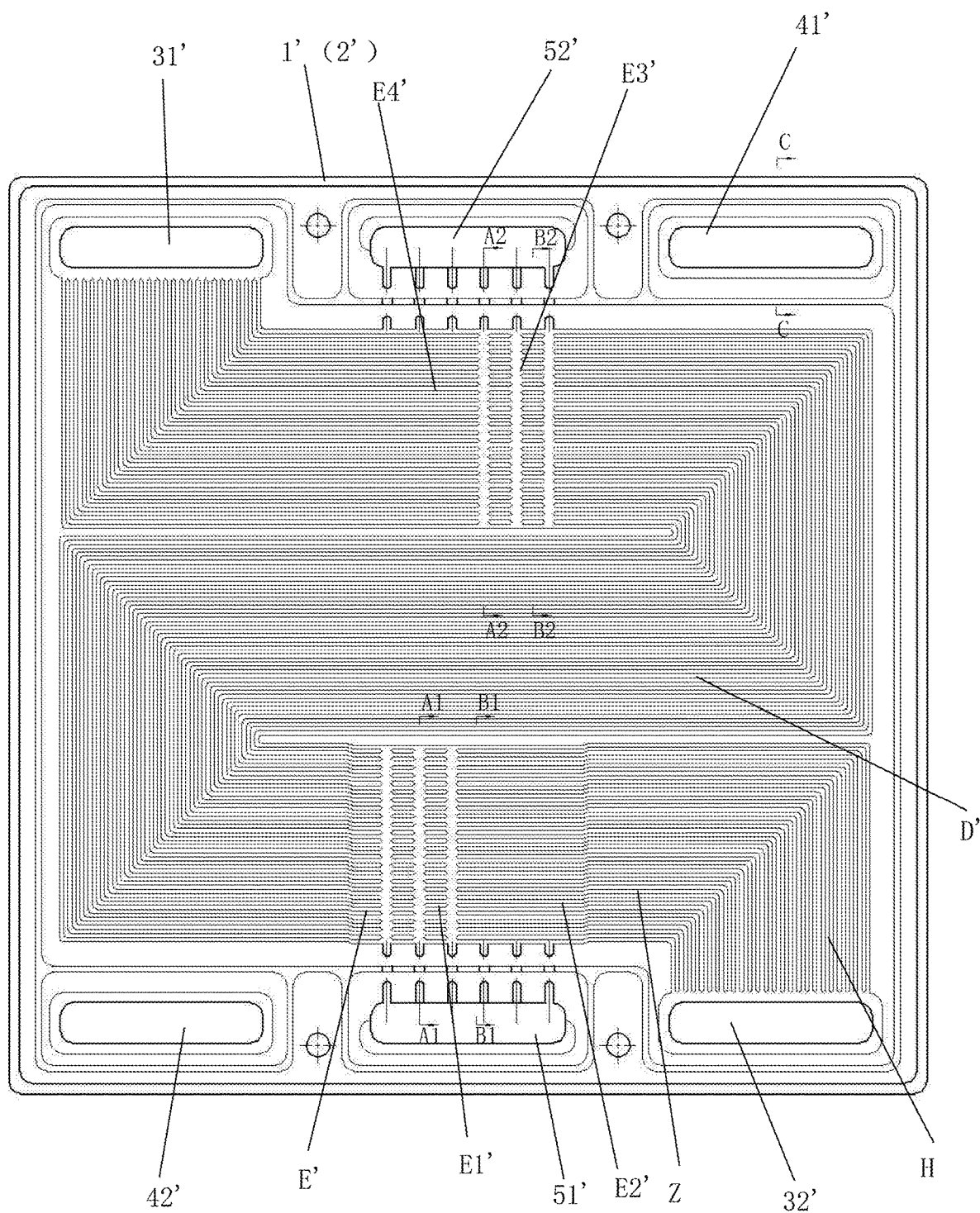
FIG. 6 is a structural schematic diagram of a fuel flow field plate and an oxidant flow field plate having the same geometrical shape described in embodiment two.
Figure 7:
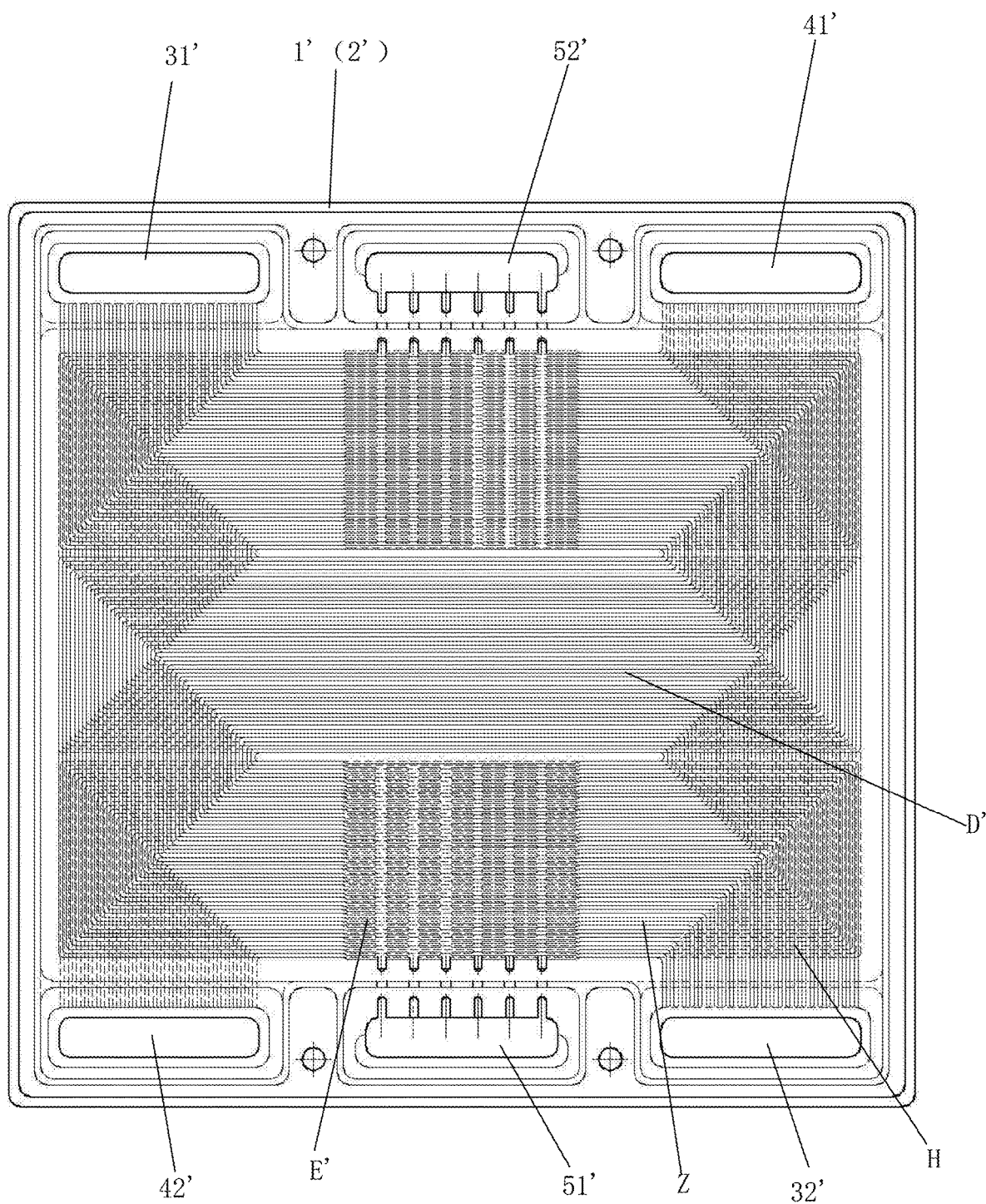
FIG. 7 is a structural schematic diagram showing a fuel flow field plate and an oxidant flow field plate having the same geometrical shape assembled together as described in embodiment two.
Figure 8:
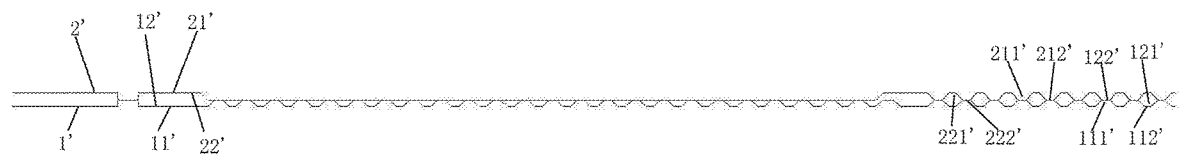
FIG. 8 is a cross-sectional diagram of a bipolar plate described in embodiment two at a position corresponding to the A1-A1 direction shown in FIG. 6.
Figure 9:
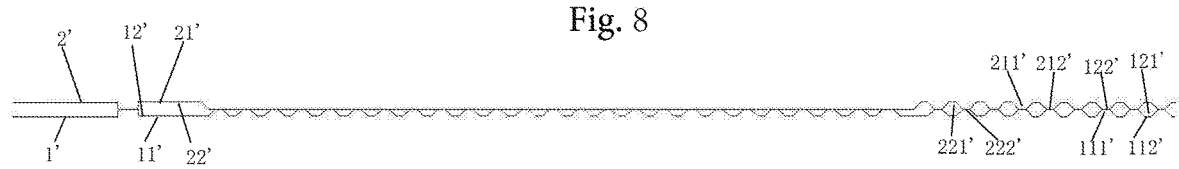
FIG. 9 is a cross-sectional diagram of a bipolar plate described in embodiment two at a position corresponding to the A2-A2 direction shown in FIG. 6.
Figure 10:
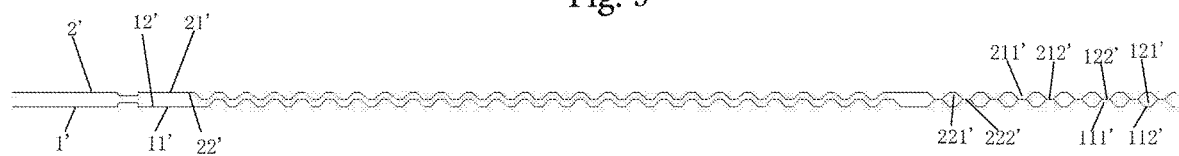
FIG. 10 is a cross-sectional diagram of a bipolar plate described in embodiment two at a position corresponding to the B1-B1 direction shown in FIG. 6.
Figure 11:
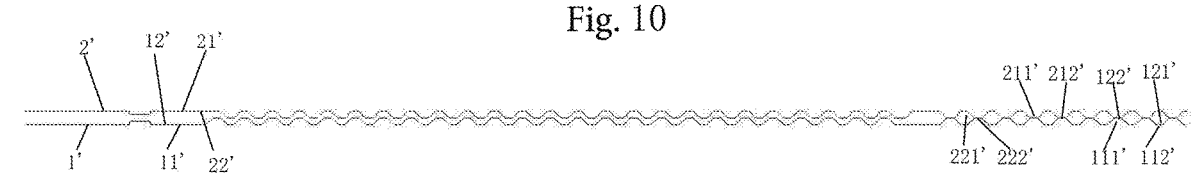
FIG. 11 is a cross-sectional diagram of a bipolar plate described in embodiment two at a position corresponding to the B2-B2 direction shown in FIG. 6.
Figure 12:
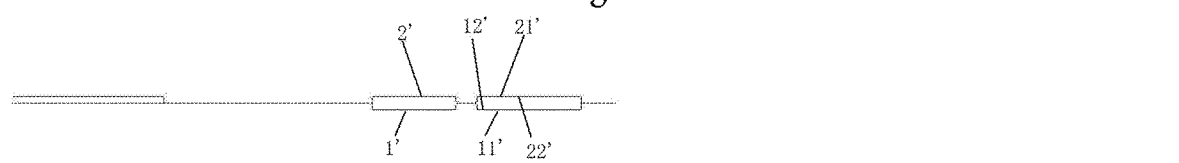
FIG. 12 is a cross-sectional diagram of a bipolar plate described in embodiment two at a position corresponding to the C-C direction shown in FIG. 6.

However, as shown in FIGS. 1 and 2, this solution will bring two redundant areas on the bipolar plate. These two redundant areas do not have any function, and can do nothing but increase the area and weight of the bipolar plates. As a result, the volume and weight of the assembled fuel cell stack will be increased and the power density will be reduced.

Undoubtedly, the versatility of the parts in the manufacturing process of the bipolar plate can be improved and the manufacturing cost of the bipolar plate can be reduced by designing the fuel flow field plate and the oxidant flow field plate with the same geometrical shape. However, for the serpentine flow channel which is being widely used in the world currently, it is even harder to design the fuel flow field plate and the oxidant flow field plate with the same geometrical shape. It is uncommon to realize the fuel flow field plate and the oxidant flow field plate with the same geometry shape in the case of using a serpentine flow channel.

FIGS. 6-12 show embodiment two of a bipolar plate with a coolant flow channel provided by the present invention, which includes a fuel flow field plate 1' and an oxidant flow field plate 2'. The fuel flow field plate 1', the oxidant flow field plate 2' and the bipolar plate are all plate-shaped, such as square or rectangular shaped, and the lengths and widths thereof are ten times greater than the thicknesses thereof. The fuel flow field plate 1' includes a first surface 11' and a second surface 12'. The first surface 11' is provided with a fuel flow channel 111' and a first reference surface 112'. The second surface 12' is provided with a first flow channel 121' and a second reference surface 122'. The oxidant flow field plate 2' includes a third surface 21' and a fourth surface 22'. The third surface 21' is provided with an oxidant flow channel 211' and a third reference surface 212'. The fourth surface 22' is provided with a second flow channel 221' and a fourth reference surface 222'. The second surface 12' of the fuel flow field plate 1' and the fourth surface 22' of the oxidant flow field plate 2' are appressed to each other to form the bipolar plate. The first reference surface 112', the second reference surface 122', the third reference surface 212' and the fourth reference surface 222' are the back surfaces of the bottoms of the first flow channel 121', the fuel flow channel 111', the second flow channel 221' and the oxidant flow channel 211', respectively. The fuel flow channel 111', the first flow channel 121', the oxidant flow channel 211' and the second flow channel 221' are grooves formed in a thickness direction of the bipolar plate with respect to first reference surface 112', the second reference surface 122', the third reference surface 212' and the fourth reference surface 222', respectively. The fuel flow field plate 1' and the oxidant flow field plate 2' are provided with six through holes including a fuel inlet channel 31', a fuel outlet channel 32', an oxidant inlet channel 41', an oxidant outlet channel 42', a coolant inlet channel 51', and a coolant outlet channel 52'. The fuel involved in the electrochemical reaction can flow into the fuel flow channel 111' from the fuel inlet channel 31'. The oxidant involved in the electrochemical reaction can flow into the oxidant flow channel 211' from the oxidant inlet channel 41'.

The bipolar plate includes an alignment area D' and at least two misalignment areas E'. The alignment area D' includes a first flow channel 121', a second reference surface 122', a second flow channel 221', and a fourth reference surface 222', and the second reference surface 122' and the fourth reference surface 222' are in contact with each other. Each misalignment area E' includes a first flow channel 121', a second reference surface 122', a second flow channel 221', and a fourth reference surface 222', and the second reference surface 122' and the fourth reference surface 222' are not in contact with each other. The two misalignment areas E' are separated by the alignment area D'. In the fuel cell stack containing the bipolar plate, the coolant is enabled to flow from the coolant inlet channel to the first flow channel or the second flow channel of one misalignment area without passing through the first flow channel and the second flow channel of the alignment area. Also, the coolant is enabled to flow from the first flow channel or the second flow channel of another misalignment area to the coolant outlet channel without passing through the first flow channel and the second flow channel of the alignment area.

The first flow channel, the fuel flow channel, the second flow channel and the oxidant flow channel each include longitudinal sections Z and transverse sections H. The flow directions of the fluid (e.g. fuel, oxidant or coolant) in the longitudinal sections Z and in the transverse sections H are perpendicular or approximately perpendicular to each other. The flow directions of fluid (e.g. fuel, oxidant or coolant) in different longitudinal sections Z are parallel or approximately parallel to each other. The total length of the longitudinal sections Z constituting the first flow channel is longer than or equals to the total length of the transverse sections H constituting the first flow channel. The total length of the longitudinal sections Z constituting the second flow channel is longer than or equals to the total length of the transverse sections H constituting the second flow channel.

Both the first flow channels in the two misalignment areas E' pertain to the longitudinal sections Z of the first flow channel. Both of the second flow channels in the two misalignment areas E' pertain to the longitudinal sections Z of the second flow channel. The fuel inlet channel and the fuel outlet channel are connected to the transverse sections H of the fuel flow channel. The oxidant inlet channel and the oxidant outlet channel are connected to the transverse sections H of the oxidant flow channel.

In the two misalignment areas, a junction of one misalignment area and the alignment area has a portion where the first interval is greater than the second interval. A junction of another misalignment area and the alignment area has a portion where the second interval is greater than the first interval. The first interval refers to the distance between the first flow channel pertaining to the misalignment area on the fuel flow field plate and the adjacent first flow channel pertaining to the alignment area. The second interval refers to the distance between the second flow channel pertaining to the misalignment area on the oxidant flow field plate and the adjacent second flow channel pertaining to the alignment area.

Both of the coolant inlet channel 51' and the coolant outlet channel 52' are connected to a plurality of misalignment areas. When the fuel flow field plate 1' and the oxidant flow field plate 2' are combined to form a bipolar plate, the plurality of misalignment areas connected to the coolant inlet channel 51' form a first interconnection area E1' and a second interconnection area E2'. The first interconnection area E1' includes a plurality of misalignment areas separated by upper support platforms. Similarly, the second interconnection area E2' also includes a plurality of misalignment areas separated by lower support platforms. The plurality of misalignment areas connected to the coolant outlet channel 52' form a third interconnection area E3' and a fourth interconnection area E4'. The third interconnection area E3' includes a plurality of misalignment areas separated by upper support platforms. Similarly, the fourth interconnection area E4' also includes a plurality of misalignment areas separated by lower support platforms. Here, the upper support platform refers to the second reference surface formed by cutting off the first flow channel. The lower support platform refers to the fourth reference surface formed by cutting off the second flow channel.

Figure 13:
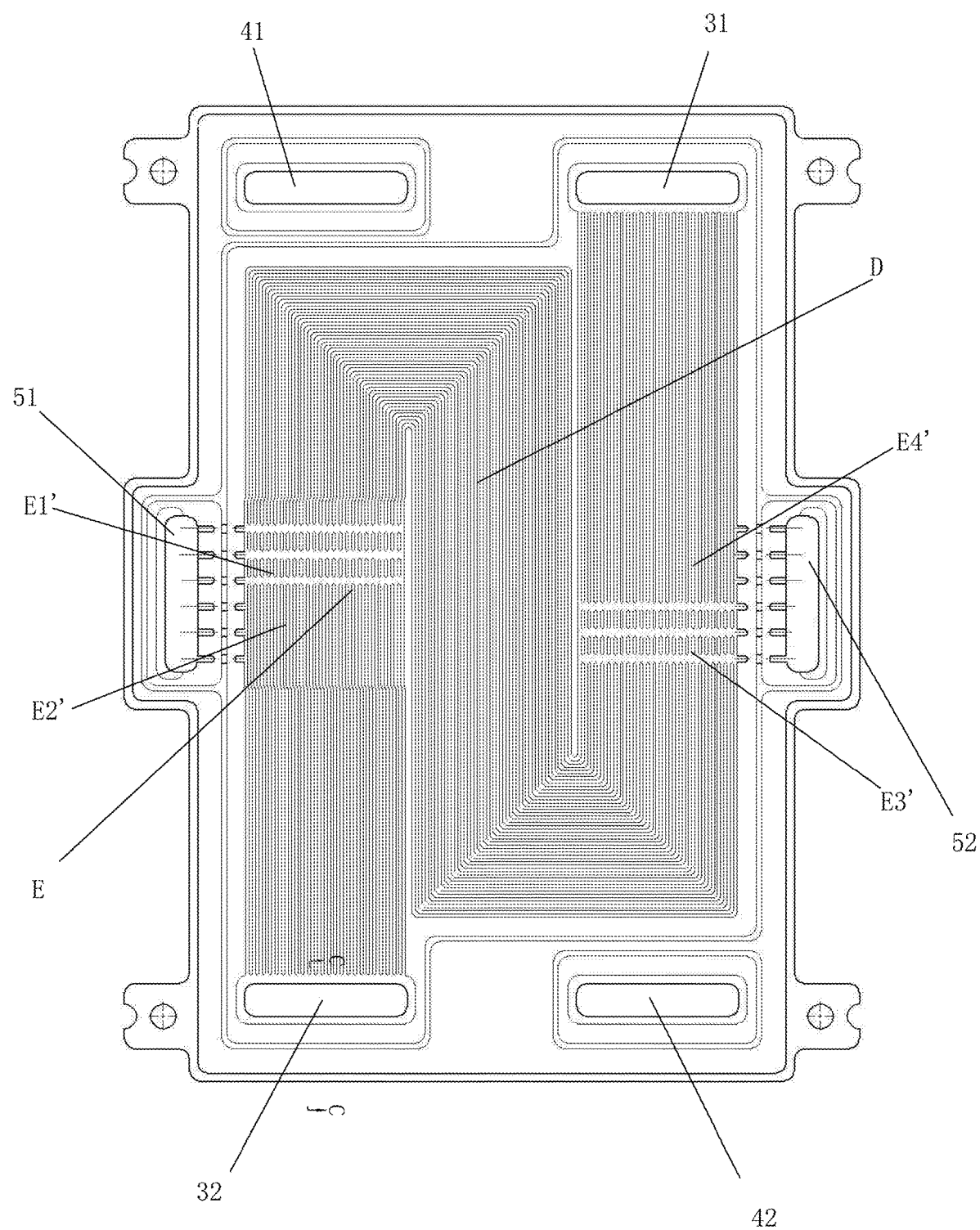
FIG. 13 is a structural schematic diagram of a fuel flow field plate and an oxidant flow field plate having the same geometrical shape as described in embodiment three.
Figure 14:
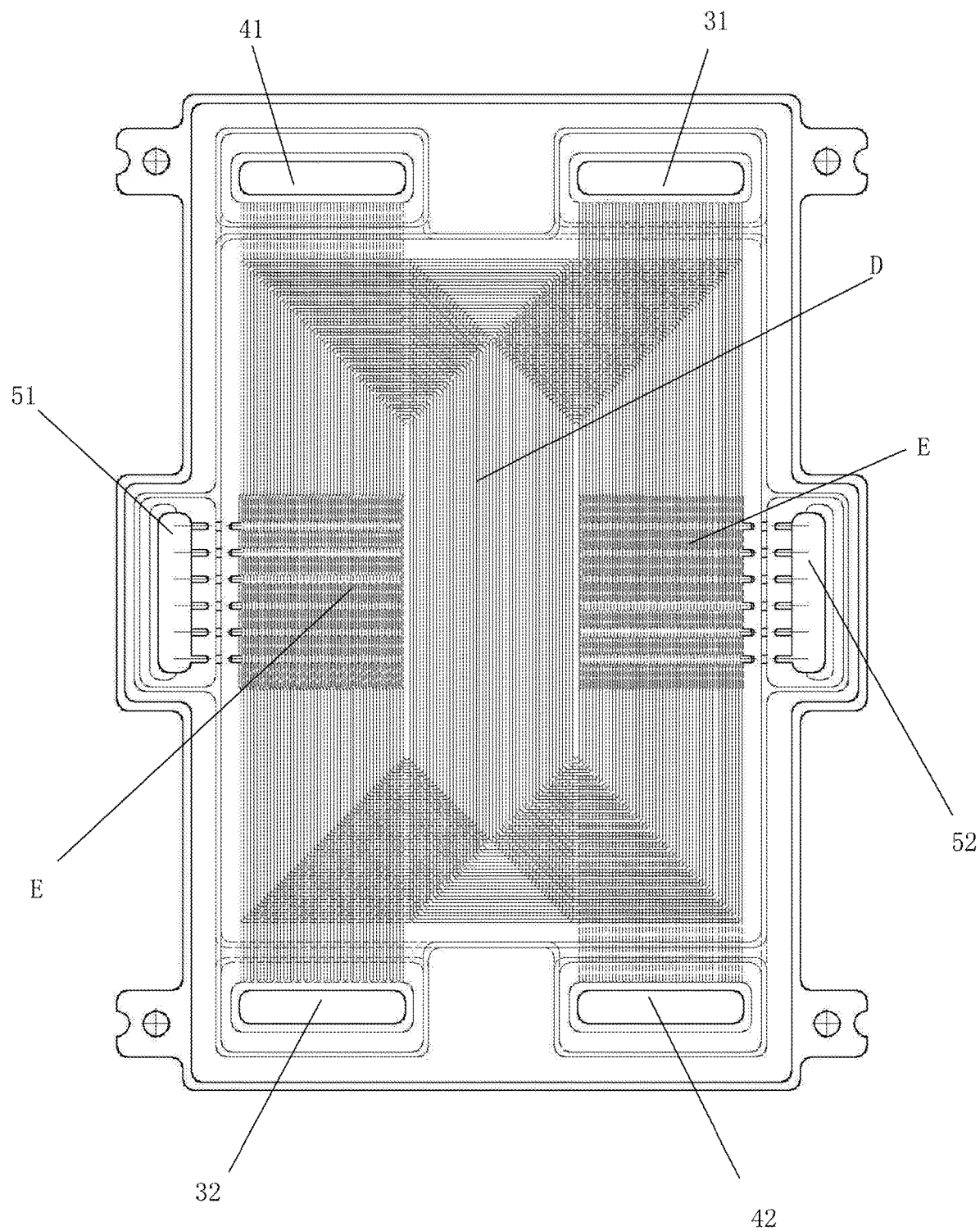
FIG. 14 is a structural schematic diagram of a fuel flow field plate and an oxidant flow field plate having the same geometrical shape assembled together as described in embodiment three.

FIGS. 13-14 show embodiment three of a bipolar plate with a coolant flow channel of the present invention, which is substantially the same as embodiment one. The only difference between embodiment three and embodiment one is that, in embodiment three, both of the coolant inlet channel and the coolant outlet channel are connected to a plurality of misalignment areas. When the fuel flow field plate 1 and the oxidant flow field plate 2 are combined to form a bipolar plate, the plurality of misalignment areas connected to the coolant inlet channel 51 form a first interconnection area E1' and a second interconnection area E2'. The first interconnection area E1' includes a plurality of misalignment areas separated by upper support platforms. Similarly, the second interconnection area E2' also includes a plurality of misalignment areas separated by lower support platforms. The plurality of misalignment areas connected to the coolant outlet channel 52 form a third interconnection area E3' and a fourth interconnection area E4'. The third interconnection area E3' includes a plurality of misalignment areas separated by upper support platforms. Similarly, the fourth interconnection area E4' also includes a plurality of misalignment areas separated by lower support platforms. Here, the upper support platform refers to the second reference surface formed by cutting off the first flow channel. The lower support platform refers to the fourth reference surface formed by cutting off the second flow channel.

In order to save on the molding cost, the fuel flow field plate and the oxidant flow field plate of the present invention are in a same geometrical shape. The fuel flow field plate and the oxidant flow field plate are formed by a metal or alloy sheet having a thickness less than 0.2 mm and subjected to press working.

In addition, the fuel flow field plate and the oxidant flow field plate are each provided with a positioning device. When the fuel flow field plate and the oxidant flow field plate are assembled into a bipolar plate, the fuel flow field plate and the oxidant flow field plate can be appressed to each other according to a predetermined position by means of the positioning device. The fuel flow field plate and the oxidant flow field plate are each provided a sealing groove.

The above-mentioned embodiments are merely used to exemplarily illustrate the principles and efficacies of the present invention, rather than limit the present invention. The present invention still can be further improved in many aspects without departing from the general inventive concept. Modifications or variations of the above-mentioned embodiments can be derived by those skilled in the art without departing from the spirit and scope of the present invention. Therefore, any equivalent modification or variation derived by those of ordinary skill in the art without departing from the spirit and technical ideas of the present invention should still be covered by the claims of the present invention.

What is claimed is:
1. A bipolar plate comprising:
   a fuel flow field plate and an oxidant flow field plate, wherein
   the fuel flow field plate and the oxidant flow field plate are both plate-shaped, and lengths and widths of each are ten times greater than thicknesses thereof;
   the fuel flow field plate comprises a first surface and a second surface, wherein the first surface is provided with a fuel flow channel and a first reference surface, and the second surface is provided with a first flow channel and a second reference surface;

the oxidant flow field plate comprises a third surface and a fourth surface, wherein the third surface is provided with an oxidant flow channel and a third reference surface, and the fourth surface is provided with a second flow channel and a fourth reference surface;

the second surface of the fuel flow field plate and the fourth surface of the oxidant flow field plate are appressed to each other to form the bipolar plate;

the first reference surface, the second reference surface, the third reference surface, and the fourth reference surface are back surfaces of bottoms of the first flow channel, the fuel flow channel, the second flow channel, and the oxidant flow channel, respectively;

the fuel flow channel, the first flow channel, the oxidant flow channel, and the second flow channel are grooves formed in a thickness direction of the bipolar plate with respect to the first reference surface, the second reference surface, the third reference surface, and the fourth reference surface, respectively;

the fuel flow field plate and the oxidant flow field plate are provided with six through holes, wherein the six through holes comprise a fuel inlet channel, a fuel outlet channel, an oxidant inlet channel, an oxidant outlet channel, a coolant inlet channel, and a coolant outlet channel;

the bipolar plate comprises an alignment area and at least two misalignment areas, wherein in the alignment area, the second reference surface and the fourth reference surface are in contact with each other, each misalignment area comprises both of the second reference surface and the fourth reference surface, and the second reference surface and the fourth reference surface are not in contact with each other in the misalignment areas;

the coolant inlet channel is interconnected with the first flow channel or the second flow channel in one misalignment area, and the coolant outlet channel is interconnected with the first flow channel or the second flow channel in the other misalignment area;

a position of the coolant inlet channel satisfies the following condition: a flow direction of a coolant flowing from the coolant inlet channel into the first flow channel or the second flow channel is perpendicular to a flow direction of the fuel flowing from the fuel inlet channel into the fuel flow channel, and a first acute angle formed by the flow direction of the coolant and the flow direction of the fuel is greater than 45°; and a position of the coolant outlet channel satisfies the following condition: a flow direction of the coolant flowing from the first flow channel or the second flow channel into the coolant outlet channel is perpendicular to a flow direction of the fuel flowing from the fuel flow channel into the fuel outlet channel, and a second acute angle formed by the flow direction of the coolant and the flow direction of the fuel is greater than 45°.

2. The bipolar plate according to claim 1, wherein
one of the misalignment areas is formed by increasing a first interval between a part of the first flow channel on the fuel flow field plate and an adjacent first flow channel pertaining to the alignment area, and the first interval is greater than an interval between the second flow channel of the misalignment area on the oxidant flow field plate and an adjacent second flow channel pertaining to the alignment area; and the other misalignment area is formed by increasing a second interval between a part of the second flow channel on the oxidant flow field plate and an adjacent second flow channel pertaining to the alignment area, the second interval is greater than an interval between the first flow channel of the misalignment area on the fuel flow field plate and an adjacent first flow channel pertaining to the alignment area.

3. The bipolar plate according to claim 1, wherein the fuel flow channel, the oxidant flow channel, the first flow channel, and the second flow channel are all S-shaped or serpentine shaped.

4. The bipolar plate according to claim 1, wherein
the misalignment areas comprise a plurality of first misalignment areas, and a plurality of second misalignment areas;

the coolant inlet channel is connected to the plurality of first misalignment areas and the coolant outlet channel is connected to the plurality of second misalignment areas;

the plurality of first misalignment areas connected to the coolant inlet channel form a first interconnection area and a second interconnection area; wherein in the first interconnection area, the first misalignment areas are separated by upper support platforms; and in the second interconnection area, the first misalignment areas are separated by lower support platforms;

the plurality of second misalignment areas connected to the coolant outlet channel form a third interconnection area and a fourth interconnection area; wherein in the third interconnection area, the second misalignment areas are separated by upper support platforms; and in the fourth interconnection area, the second misalignment areas are separated by lower support platforms; and the upper support platforms refer to the second reference surface formed by cutting off the first flow channel, and the lower support platforms refer to the fourth reference surface formed by cutting off the second flow channel.

5. The bipolar plate according to claim 4, wherein the fuel flow field plate and the oxidant flow field plate are in a same geometrical shape.

6. The bipolar plate according to claim 1, wherein
the fuel flow field plate and the oxidant flow field plate are each provided with a positioning device;

when the fuel flow field plate and the oxidant flow field plate are assembled into the bipolar plate, the fuel flow field plate and the oxidant flow field plate are appressed to each other according to a predetermined position by means of a positioning device; and the fuel flow field plate and the oxidant flow field plate are each provided a sealing groove.

7. The bipolar plate according to claim 1, wherein the fuel flow field plate and the oxidant flow field plate are formed by a metal or alloy sheet having a thickness of less than 0.2 mm subjected to press working.

8. A bipolar plate comprising:
a fuel flow field plate and an oxidant flow field plate, wherein
the fuel flow field plate and the oxidant flow field plate are both plate-shaped, and lengths and widths of each are ten times greater than thicknesses thereof;

the fuel flow field plate comprises a first surface and a second surface, the first surface is provided with a fuel flow channel and a first reference surface, and the second surface is provided with a first flow channel and a second reference surface;

the oxidant flow field plate comprises a third surface and a fourth surface, the third surface is provided with an oxidant flow channel and a third reference surface, and the fourth surface is provided with a second flow channel and a fourth reference surface;

the second surface of the fuel flow field plate and the fourth surface of the oxidant flow field plate are appressed to each other to form the bipolar plate;

the first reference surface, the second reference surface, the third reference surface, and the fourth reference surface are back surfaces of bottoms of the first flow channel, the fuel flow channel, the second flow channel, and the oxidant flow channel, respectively;

the fuel flow channel, the first flow channel, the oxidant flow channel, and the second flow channel are grooves formed in a thickness direction of the bipolar plate with respect to the first reference surface, the second reference surface, the third reference surface, and the fourth reference surface, respectively;

the fuel flow field plate and the oxidant flow field plate are provided with six through holes, and the six through holes comprise a fuel inlet channel, a fuel outlet channel, an oxidant inlet channel, an oxidant outlet channel, a coolant inlet channel, and a coolant outlet channel;

the bipolar plate comprises an alignment area and at least two misalignment areas, wherein the alignment area comprises the first flow channel, the second reference surface, the second flow channel, and the fourth reference surface, the second reference surface and the fourth reference surface are in contact with each other in the alignment area, each misalignment area comprises the first flow channel, the second reference surface, the second flow channel, and the fourth reference surface, the second reference surface and the fourth reference surface are not in contact with each other in the misalignment areas, and the misalignment areas are separated by the alignment area;

in a fuel cell stack containing the bipolar plate, a coolant is enabled to flow from the coolant inlet channel to the first flow channel or the second flow channel of one of the misalignment areas without passing through the first flow channel and the second flow channel of the alignment area, and the coolant is enabled to flow from the first flow channel or the second flow channel of the other misalignment area to the coolant outlet channel without passing through the first flow channel and the second flow channel of the alignment area;

the first flow channel, the fuel flow channel, the second flow channel, and the oxidant flow channel each comprises a plurality of longitudinal sections and a plurality of transverse sections, wherein flow directions of fluids in the longitudinal sections and the transverse sections are perpendicular to each other, flow directions of fluids in different longitudinal sections are parallel to each other, a total length of the longitudinal sections constituting the first flow channel is longer than or equal to a total length of the transverse sections constituting the first flow channel, and a total length of the longitudinal sections constituting the second flow channel is longer than or equal to a total length of the transverse sections constituting the second flow channel; and the first flow channels in the misalignment areas pertain to the longitudinal sections of the first flow channel, the second flow channels in the misalignment areas pertain to the longitudinal sections of the second flow channel, the fuel inlet channel and the fuel outlet channel are connected to the transverse sections of the fuel flow channel, and the oxidant inlet channel and the oxidant outlet channel are connected to the transverse sections of the oxidant flow channel.

9. The bipolar plate according to claim 8, wherein in the two misalignment areas, a junction of one misalignment area and the alignment area has a portion where a first interval is greater than a second interval, and a junction of the other misalignment area and the alignment area has a portion where the second interval is greater than the first interval; and the first interval refers to a distance between the first flow channel pertaining to the misalignment area on the fuel flow field plate and an adjacent first flow channel pertaining to the alignment area, and the second interval refers to a distance between the second flow channel pertaining to the misalignment area on the oxidant flow field plate and an adjacent second flow channel pertaining to the alignment area.

10. The bipolar plate according to claim 8, wherein the misalignment areas comprise a plurality of first misalignment areas, and a plurality of second misalignment areas;

the coolant inlet channel is connected to the plurality of first misalignment areas and the coolant outlet channel is connected to the plurality of second misalignment areas;

the plurality of first misalignment areas connected to the coolant inlet channel form a first interconnection area and a second interconnection area; wherein in the first interconnection area, the first misalignment areas are separated by upper support platforms; and in the second interconnection area, the first misalignment areas are separated by lower support platforms;

the plurality of second misalignment areas connected to the coolant outlet channel form a third interconnection area and a fourth interconnection area; wherein in the third interconnection area, the second misalignment areas are separated by upper support platforms; and in the fourth interconnection area, the second misalignment areas are separated by lower support platforms; and the upper support platforms refer to the second reference surface formed by cutting off the first flow channel, and the lower support platforms refer to the fourth reference surface formed by cutting off the second flow channel.

11. The bipolar plate according to claim 10, wherein the fuel flow field plate and the oxidant flow field plate are in a same geometrical shape.

12. The bipolar plate according to claim 8, wherein the fuel flow field plate and the oxidant flow field plate are each provided with a positioning device;

when the fuel flow field plate and the oxidant flow field plate are assembled into the bipolar plate, the fuel flow field plate and the oxidant flow field plate are appressed to each other according to a predetermined position by means of a positioning device; and the fuel flow field plate and the oxidant flow field plate are each provided a sealing groove.

13. The bipolar plate according to claim 8, wherein the fuel flow field plate and the oxidant flow field plate are formed by a metal or alloy sheet having a thickness of less than 0.2 mm subjected to press working.

* * * * *